J. SCHNEIDER.
SWITCH.
APPLICATION FILED JAN. 15, 1919.
1,343,793.
Patented June 15, 1920.
2 SHEETS—SHEET 1.
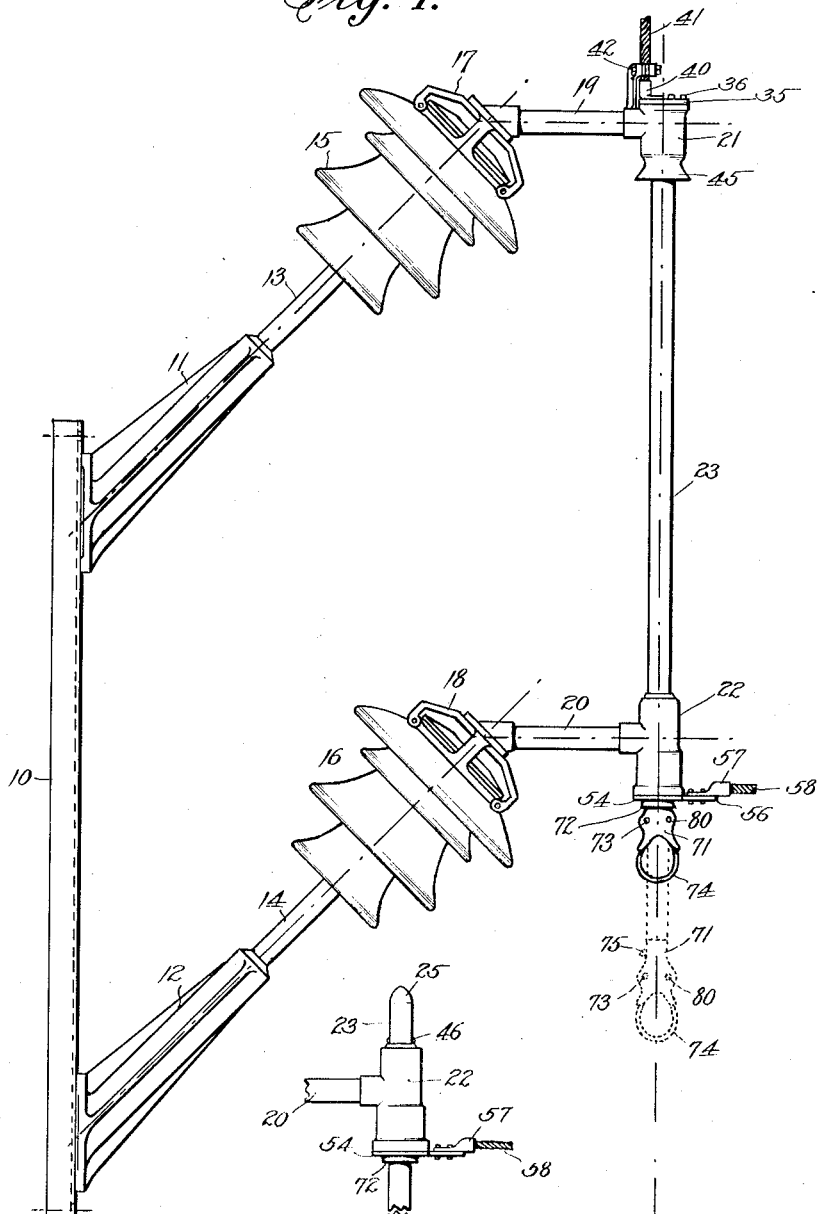
Fig. 1.
Fig. 2.
WITNESSES
INVENTOR
John Schneider
BY 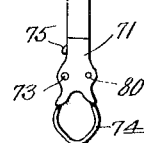
ATTORNEY J. SCHNEIDER.
SWITCH.
APPLICATION FILED JAN. 15, 1919.
1,343,793.
Patented June 15, 1920.
2 SHEETS—SHEET 2.
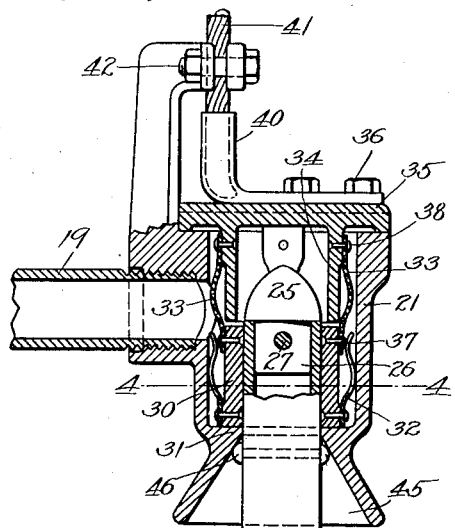
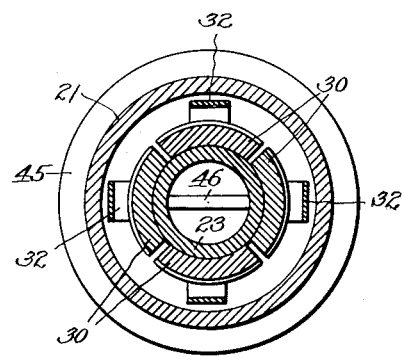
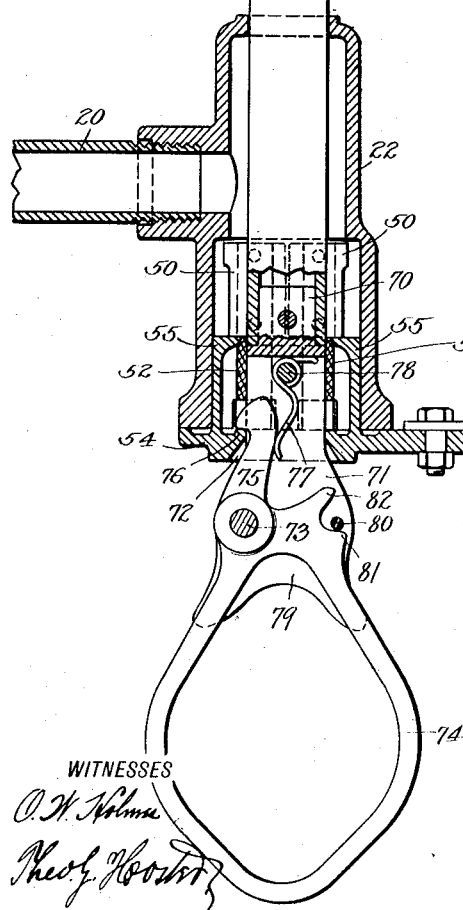
WITNESSES
INVENTOR
John Schneider
BY
ATTORNEYS

UNITED STATES PATENT OFFICE.

JOHN SCHNEIDER, OF ELIZABETH, NEW JERSEY.

SWITCH.

1,343,793. Specification of Letters Patent. Patented June 15, 1920.

Application filed January 15, 1919. Serial No. 271,248.

*To all whom it may concern:*

Be it known that I, JOHN SCHNEIDER, a citizen of the United States, and a resident of Elizabeth, in the county of Union and State of New Jersey, have invented a new and Improved Switch, of which the following is a full, clear, and exact description.

The invention relates to high tension switches of the plunger type, and its object is to provide a new and improved disconnecting switch arranged to combine maximum rigidity with minimum of weight and to allow of conveniently and easily opening and closing the switch. Another object is to maintain the operating members in perfect alinement when the switch is open or closed thus insuring perfect electrical contact when the switch is closed. Another object is to protect the contact making parts from moisture, dust or other extraneous matter and to render the plunger self-cleaning.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the switch with the plunger in closed position;

Fig. 2 is a similar view of part of the same with the plunger in open position;

Fig. 3 is an enlarged sectional side elevation of the switch;

Fig. 4 is an enlarged sectional plan view of the same on the line 4—4 of Fig. 3; and Fig. 5 is a side elevation of the lower end of the plunger.

The support 10 of the switch is provided with upwardly inclined brackets 11 and 12 carrying pins 13 and 14 supporting the usual cylinders 15 and 16 provided with caps 17 and 18. From the caps 17 and 18 extend horizontal pins 19 and 20 on which are screwed or otherwise secured the upper and lower casings 21 and 22 of the switch. The casings 21 and 22 have a vertical axis in common and a plunger 23 is mounted to slide up and down in the lower casing 22 and is adapted to pass into and out of the upper casing 21 with a view to close or open the switch as hereinafter more fully explained.

The plunger 23 is preferably in the form of a copper tube and is provided at its upper end with a pointed head 25 provided with a neck 26 fitting into the upper end of the plunger and being secured therein by a fastening pin 27. The upper end of the plunger 23 is adapted to be engaged by a contact made in sections 30 of segmental shape and arranged in a circle to fit snugly against the exterior surface of the upper end of the plunger 23, as plainly indicated in Figs. 3 and 4. The plunger sections 30 are seated on the bottom 31 of the casing 21 and each section is provided on its outer face with a spring 32 bearing against the inner wall of the casing 21 to hold the section in firm contact with the upper end of the plunger 23 to insure a perfect contact with the plunger and the contact sections 30. Each contact section 30 is connected by a conductor 33 with a lug 34 depending from a cap 35 fastened by bolts or other fastening devices 36 to the top of the upper casing 21 to close the latter at the top. The conductors 33 are fastened by rivets 37 and 38 to the sections 30 and the lugs 34, and the said conductors are preferably made of wire formed into a flat braid, as indicated in Fig. 3. The cap 35 is provided with a terminal 40 into which fits one end of the line wire or cable 41 engaged by a clamp 42 attached to or forming part of the casing 21. It will be noticed that by the arrangement described a proper electrical connection is had between the line wire or cable 41 and the upper end of the plunger 23 when the latter is in uppermost closed position. It will be noticed that when the conductor 23 is pulled downward then its upper end passes out of the contact sections 30 and out of the casing 21 to open the switch and when the plunger 23 is moved upward then its pointed head 25 readily enters the casing and passes between the contact sections 30 which are thus forced outward against the tension of their springs 32 to insure firm contact with the upper end of the plunger 23. The lower end of the casing 21 is preferably provided with a flaring entrance 45 to readily guide the head 25 into central position during the upward movement of the plunger. A stop pin 46 is secured near the upper end of the plunger and is adapted to be seated in the entrance 45 to limit the upward movement of the plunger 23, as plainly shown in Fig. 3. When the plunger 23 is drawn downward then the pin 46 is adapted to be seated on the top of the casing 21 (see Fig. 2) to limit the downward movement of the plunger 23.

The lower end of the plunger 23 is engaged exteriorly by a contact made in sections 50 similar to the sections 30 and likewise pressed on by springs 51 bearing against the inner wall of the casing 22 within which the contact sections 50 are arranged, as plainly shown in Fig. 3. The sections 50 are connected by conductors 52, similar to the conductors 33, with lugs 53 rising from the top of a cap 54 fitted on the lower end of the casing 22. The cap 54 is provided with upwardly extending members 55 fitting snugly within the lower end of the casing 22 to center the cap 54, as plainly indicated in Fig. 3. The cap 54 is provided with a sidewise extending arm 56 on which is fastened a terminal 57 for the line wire or cable 58. It will be noticed that by the arrangement described, a perfect electrical connection is had between the line wire or cable 58 and the plunger 23 by way of the cap 54, conductors 52 and the contact sections 50 pressed on by their springs 51 in engagement with the exterior surface of the plunger 23.

In order to move the plunger 23 up or down into closed or open position and to lock the plunger when in closed position the following arrangement is made: Into the lower end of the plunger 23 fits the shank 70 of a bracket 71 extending through an opening 72 in the bottom cap 54. On the outer end of the bracket 71 is arranged a pivot 73 disposed to one side of the axis of the plunger 23, and on this pivot is mounted to swing a depending loop 74 adapted to be engaged by a suitable tool for pulling the plunger 23 downward into open position or upward into closed position. The loop 74 is provided at its upper end with a catch 75 adapted to engage an annular ledge 76 formed on the top of the cap 54. The catch 75 is pressed on by a spring 77 held on a pin 78 attached to the bracket 71 which latter is preferably in the form of a fork, as plainly indicated in Fig. 5. The spring 77 holds the catch 75 in engagement with the ledge 76 thus locking the plunger 23 in uppermost position. When the loop 74 is engaged by a tool and a downward pull is exerted on the loop then the latter swings slightly on its pivot 73 as the latter is located to one side of the axis of the plunger, and this swinging movement of the loop 74 causes the catch 75 to disengage the ledge 76 thus allowing the plunger 23 to be pulled downward into open position. The lower end of the bracket 71 is provided with a fork 79 which registers with the upper portion of the loop 74, and this fork 79 is adapted to be engaged by the tool for pushing the plunger 23 upward to cause the catch 75 to engage the conical wall of the opening 72 and to finally snap on to the ledge 76 to lock the plunger 23 in place when in uppermost position. The rocking movement of the loop 74 is limited by a stop pin 80 extending between plugs 81 and 82 formed on the loop 74 directly opposite the pivot 73.

It will be noticed that by the arrangement described the switch can be conveniently and easily opened or closed on pulling down the plunger 23 or pushing the same upward, as above explained. It will also be noticed that the switch combines maximum rigidity with a minimum of weight and the plunger 23 is properly guided in its up and down movement and this movement is limited by the stop pin 46, as above explained. It will further be noticed that when the plunger 23 is pushed upward into closed position then any extraneous matter that may adhere to the upper end of the plunger is stripped off during the time the upper end of the plunger passes through the entrance 45 and into the contact sections 30. As the contact-making parts are arranged within the upper and lower casings 21 and 22 they are completely protected against moisture, dust and other deleterious matter.

Having thus described my invention, I claim as new and desire to secure by Letters Patent:—

1. A switch, comprising alined casings spaced apart, a plunger slidable in one casing and adapted to pass into the other casing, multiple spring pressed contacts held in the said casings and adapted to engage the plunger, caps on the said casings and provided with conductors attached to the members of the said multiple contacts, and terminals on the said caps.

2. A switch, comprising alined casings spaced apart, a plunger slidable in one casing and adapted to pass into the other casing, multiple spring pressed contacts held in the said casings and adapted to engage the plunger, caps on the said casings and provided with conductors attached to the members of the said multiple contacts, terminals on the said caps, and a stop on the said plunger and adapted to engage one of the casings to limit the movement of the plunger in one direction and adapted to engage the other casing to limit the movement in the opposite direction.

3. A switch, comprising alined casings spaced apart, a plunger slidable in one casing and adapted to pass into the other casing, multiple spring pressed contacts held in the said casings and adapted to engage the plunger, caps on the said casings and provided with conductors attached to the members of the said multiple contacts, terminals on the said caps, and an operating and locking means on the said plunger for moving the latter into open or closed position and locking the plunger in closed position.

4. A switch, comprising alined casings spaced apart, a plunger slidable in one casing and adapted to pass into the other casing, multiple spring pressed contacts held in the said casings and adapted to engage the plunger, caps on the said casings and provided with conductors attached to the members of the said multiple contacts, terminals on the said caps, a bracket on one end of the plunger, and a loop fulcrumed on the said bracket and having a catch adapted to engage the corresponding casing to lock the plunger in closed position.

5. A switch, comprising alined upper and lower casings provided with caps carrying terminals, contacts held in the said casings and each made in sections arranged in a circle, conductors connecting the said caps with the sections of the corresponding contact, springs pressing the said contact sections, and a plunger slidable in the lower casing and engaged by the said sections of the contact in the lower casing, the upper end of the plunger being adapted to pass into the upper casing to be engaged by the spring pressed sections of the contact in the upper casing.

6. In a switch of the plunger type, a plunger movable longitudinally into open or closed position, a handle on said plunger to move the latter into open or closed position, said handle being pivoted to said plunger and provided with an integral catch extension arranged to normally lock the plunger when the latter is in closed position and to release said plunger by movement of said handle upon its pivot so that it may be moved into open position.

7. In a switch of the plunger type, a casing, a plunger slidable therein and provided with a bracket extending beyond the casing, a loop pivoted on the said bracket to one side of the axis of the plunger, the said loop having a catch adapted to engage the casing to lock the plunger when in closed position, a spring pressing the said catch, and a limiting means to limit the swinging movement of the said loop and its catch.

JOHN SCHNEIDER.